United States Patent [19]
Bernard et al.

[11] 3,746,832
[45] July 17, 1973

[54] ARC WELDING GUN UNITIZED GAS HOSE AND ELECTRICAL CONTROL CORD

[75] Inventors: Arthur A. Bernard, Beecher, Richard A. Bernard, Flossmoor, both of Ill.

[73] Assignee: Dover Corporation, New York, N.Y.

[22] Filed: July 29, 1971

[21] Appl. No.: 167,306

[52] U.S. Cl. .................. 219/130, 219/74, 219/136
[51] Int. Cl. ............................................. B23k 9/00
[58] Field of Search ................... 219/130, 74, 136; 174/15 C, 47, 69; 340/320

[56] References Cited
UNITED STATES PATENTS

| | | | |
|---|---|---|---|
| 3,324,233 | 6/1967 | Bryant | 174/69 |
| 3,163,707 | 12/1964 | Darling | 174/47 |
| 2,917,568 | 12/1959 | Moorman et al. | 174/47 |
| 3,333,044 | 7/1967 | Toto | 219/136 |
| 3,340,346 | 9/1967 | Toto | 214/136 |

FOREIGN PATENTS OR APPLICATIONS 1,114,169   5/1968   Great Britain ...................... 219/75

*Primary Examiner*—J. V. Truhe
*Assistant Examiner*—George A. Montanye
*Attorney*—James P. Hume, James B. Blanchard and Charles E. Quarton

[57] ABSTRACT

A unitized shielding gas hose and electrical control cord conduit including a resilient elongate tubular gas hose and a pair of elongate control wires extending within the gas hose. The control wires are twisted together in the gas hose alternately in right and left-hand twist directions to be free to untwist and extend when the conduit is stretched and tend to rewind when the stretch force is removed. Means are also disclosed forming a seal between the control wires and the wall of the gas hose at the entry of the control wires into the gas hose and at the exit of the control wires from the gas hose.

7 Claims, 3 Drawing Figures

Patented July 17, 1973 3,746,832
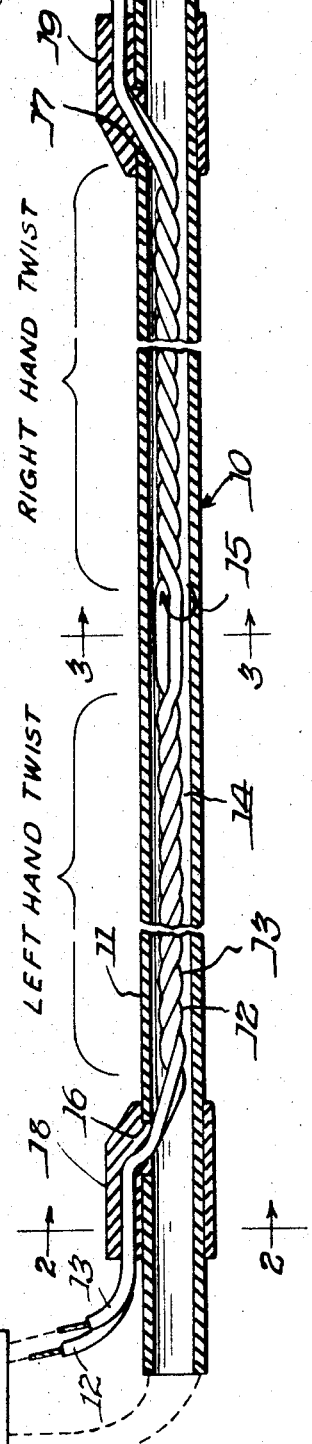
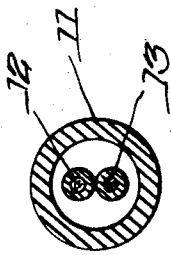
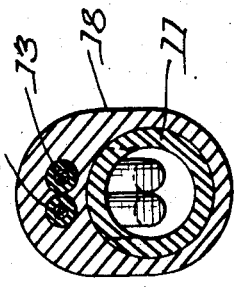

ARC WELDING GUN UNITIZED GAS HOSE AND ELECTRICAL CONTROL CORD

This invention relates to a unique flexible conduit which conveys weld shielding gas to an arc welding gun and which also contains and protects the electrical control wires which connect to the electric control switch on the arc welding gun.

In welding guns used for applying gas-shielded consumable-electrode arc welding processes, there are at least four flexible members which are connected to the welding gun, namely: the welding current conducting cable, the flexible conduit through which the consumable electrode is fed to the gun, the flexible hose through which the shielding gas is fed to maintain a shielding blanket over the welding operation, and an electric control cord which connects to an ON/OFF switch on the gun. These four members add weight to the welding gun and also bulk and stiffness which tend to interfere with free and easy manipulation. Of particular importance with respect to the present invention is the fact that the electric control cord connected to the control switch on the gun is frequently the first member to break under tension when the welding operator pulls on the gun to try to stretch out the connected members in order to reach the most distant areas from the stationary welding equipment.

An important object of this invention, therefore, is to provide one conduit in the form of a conventional small size air hose which not only conveys the weld shielding gas to the welding gun but which also serves as a conduit to contain and protect the fragile small gauge electric wires which run from the switch on the gun to the remote stationary apparatus controlled by the switch. By combining these two members of the conventional four members into one, weight, bulk, and stiffness is reduced.

A most important object of this invention is to provide an arc welding gun electric control wire system which is contained within the shielding gas hose but which can stretch out in length without breaking even though the gas hose is stretched to as much as five per cent beyond its normal length. As will be full described further on, this ability for stretching in length as the gas hose stretches is provided by alternately twisting the electric wires, one around the other, in right-hand and left-hand directions. Twisting the wires in this manner reduces their length, and since the wires are twisted in alternated directions, they are free to stretch out without breaking by untwisting when the stretchable conduit is subjected to a tensile or pull force and then tend to retwist to return to their shorter twisted length when the tensile or pull force is removed.

Still another important object of this invention is to provide a pressure tight gas seal where the control wires pass through the wall of the flexible gas hose adjacent the end at which the hose is connected to the source of the shielding gas and where the wires pass through the wall of the hose at the opposite end at the flexible gas hose connected to a hose connection within the handle of the arc welding gun.

Other objects, features, and advantages of this invention will be apparent from the following description considered in conjunction with the accompanying drawings in which:

FIG. 1 is a sectional longitudinal view of this invention.

FIG. 2 is a cross-sectional view taken across lines 2—2 of FIG. 1.

FIG. 3 is a cross-sectional view taken across lines 3—3 of FIG. 1.

In the application drawings, the details shown are quite close to scale and represent a size suitable for connection to arc welding guns with capacities for handling welding currents up to 600 amperes. The unitized gas hose and electrical control cord conduit 10 includes a gas hose 11 similar in size and composition to an ordinary air hose of the type used for inflating automobile tires. More specifically, the gas hose 11 is a single ply reinforced hose composed of rubber or neoprene and having an inside diameter of about seven/thirty-second inch, a wall thickness of about five/sixty-fourth inch, and an outside diameter of about three/eighth inch. The electric control wires 12 and 13 are each 18 gauge and electrically insulated with a thin wall jacket composed of rubber, neoprene, teflon, or the like.

Depending on the type of shielding gas used, upward to 60 cubic feet of gas per hour may be required to efficiently shield the welding operation applied with a 600 ampere welding arc. To convey this volume of gas to the welding gun, a conventional gas hose with an inside diameter not less than three/sixteenth inch and cross-sectional area of 0.0276 square inch is required. In FIG. 1, the inside diameter of the gas hose 11 is seven/thirty-second inch providing a cross-sectional area of about 0.0376 square inch. The combined cross-sectional area of the two control wires is about 0.0086 square inch. Hence, the actual cross-sectional are of interior duct 14 for flow of gas through the conduit 10 is about 0.029 square inch which is slightly more than a conventional 3/16 inch inside diameter hose.

For the purpose of explanation, it may be assumed that the gas hose has an overall length at rest of 120 inches, and that when this 120 inch length hose is connected to a welding gun and the hose given a severe pull, the hose will resiliently stretch as much as 6 inches to a length of 126 inches. In this case, to prevent the control wires 12 and 13 within the hose 11 from breaking, the length of the control wires prior to twisting must be not less than 126 inches long — maximum expected resiliently stretched length of the gas hose — and are preferably considerably longer. The control wires 12 and 13 are twisted together, one around the other, so that their length after twisting is shortened to about 120 inches. It is very important to note, however, that the twisting of the control wires 12 and 13 is not in one direction only, but rather, in both a right-hand or clockwise direction and a left-hand or counterclockwise direction so that when the resilient conduit is stretched, the control wires will be free to untwist and in so doing lengthen. This could not take place if the two wires were twisted one around the other in one twist direction only. Actually, in a 10 foot length conduit, there are preferably not less than four segments of twisted wire each about 2½ feet long with two of the four sections twisted to the right and two sections twisted to the left with the untwisted length of the wires 12 and 13 in each of the four segments being about 32 inches long which when twisted is reduced to about 30 inches. To reduce the 32 inch lengths to 30 inches requires about 40 twists, which totals about 160 twists for the 10 foot length.

It should be noted in FIG. 1 that the right-hand twist segment and the left-hand twist segment are joined by an untwisted segment in which the control wires 12 and 13 are substantially linear. As the conduit 10 is stretched, the linear portions of the control wires 12 and 13 are free to rotate as indicated by the arrow 15 thereby permitting the control wires 12 and 13 to untwist and lengthen. When the stretch force is removed, the control wires 12 and 13 tend to rotate in the opposite direction and rewind. However, when the conduit 10 is stretched for the first time in service and the internal control wires 12 and 13 lengthen by untwisting, it is not critical that the wires 12 and 13 re-twist back completely to their original number of turns when the stretching force is removed. The important factor is that the conduit 10 contain control wires 12 and 13 which before twisting are each at least equal to the maximum expected stretched length of the gas hose and which are twisted together in a number of alternate left and right-hand twist segments so the wires are free to unwind and lengthen. The total length of the left-hand twist segments should be substantially equal to the total length of the right-hand twist segments. When the stretch force is removed and the conduit returns to its length at rest, the control wires 12 and 13 may partially re-twist and partially separate outwardly from each other to bear against the inner surface of the gas hose 11, a condition which in no way reduces the cross-sectional area through which the shielding gas flows.

In order to insure that the twisted segments of control wires 12 and 13 are free to rotate and untwist as the gas hose is stretched and free to re-twist and partially separate when the stretch force is removed, the sum of the exterior diameters of the control wires 12 and 13 should be at least slightly less than the internal diameter of the gas hose 11.

The control wires 12 and 13 enter and leave the gas hose 11 through two holes 16 and 17 pierced through the wall of the gas hose. The control wires 12 and 13 are securely anchored to the outer surface of the gas hose 11 by annular molded-on sealing formations 18 and 19 composed of rubber or neoprene. As is clear in the drawing, the holes 16 and 17 in the wall of the gas hose 11 through which the control wires pass are sealed to be pressure tight by the respective sealing formations 18 and 19. During the molding operation, form-fitting cores are pressed into the conduit to prevent the molding material from entering the conduit. If the material which forms the insulating jackets on the control wires 12 and 13 is compatible with the rubber or neoprene from which the sealing formations 18 and 19 are molded, then efficient vulcanization takes place between the formations 18 and 19, the outer surface of the gas hose 11, and the jackets of the control wires 12 and 13. If the material of the control wire insulating jackets is not compatible (for example, if the insulation on the wires is teflon), then the insulating jacket is stripped from the wires for a short length and vaulcanization is accomplished directly to the copper strands of the control wires.

In application, the portion of one end of the gas hose 11 extending beyond the sealing formation 18 can be pushed over a hose nipple of the shielding gas supply and clamped thereon with a conventional hose clamp while the similarly extending portion of the gas hose 11 at the opposite end of the conduit 10 can be pushed over and clamped to a hose nipple located within the handle of the arc welding gun.

It should be understood that the unitized gas hose and electrical control cord conduit can be any length from a few feet up to 50 feet or more, and that the size of the conduit and the size of the control wires can be smaller or larger than the sizes referred to herein. While the control wires must be alternately twisted so that there is at least one right-hand twist segment and at least one left-hand twist segment, there may be several right-hand twist segments and several left-hand twist segments of suitable lengths with the total number and lengths of right-hand twist segments preferably equal to the total number and lengths of the left-hand twist segments. Further, there can be three or more wires within the gas hose. For example, a third wire can be used for grounding the arc welding gun, and the objects of this invention would be provided so long as (a) all three wires are wound around each other, and (b) there are two or more sections alternately wound so that the wires are free to unwind the and lengthen when subjected to a tensile force and tend to rewind when the tensile force is removed.

What we claim as our invention is:

1. In a gas-shielded arc welding system which includes an arc welding gun, a source of shielding gas and apparatus electrically controlled by a switch on said arc welding gun, a unitized gas hose and electrical control cord connecting the arc welding gun switch to said controlled apparatus comprising:

a resilient elongate tubular gas hose;

two more elongate insulated electrically conductive control wires extending within said tubular gas hose, said control wires being twisted together for portions of their lengths within said gas hose alternately in clockwise and counterclockwise twist directions, said control wires extending out of said gas hose through a first opening in the wall of said gas hose in proximity to one end of said gas hose and connected to said switch, said control wires extending out of said gas hose through a second opening in the wall of said gas hose in proximity to the opposite end of said gas hose and connected to said controlled apparatus, said control wires each having a length when untwisted at least equal to the maximum expected resiliently stretched length of said gas hose;

first sealing means providing a pressure tight seal between said control wires and the wall of said gas hose in said first opening; and second sealing means providing a pressure tight seal between said control wires and the wall of said gas hose in said second opening.

2. The invention defined in claim 1 wherein the sum of the exterior diameters of said pair of insulated control wires is at least slightly less than the internal diameter of said gas hose.

3. The invention defined in claim 1 wherein said control wires extend untwisted for a third portion of their lengths within said tubular gas hose between the clockwise twist portion and the counterclockwise twist portion.

4. The invention defined in claim 1 wherein the number of clockwise twisted portions equals the number of counterclockwise twisted portions.

5. The invention defined in claim 1 wherein the total length of the clockwise twisted portions equals the total length of the counterclockwise twisted portions.

6. The invention defined in claim 1 wherein said first and second sealing means comprise annular sealing formations molded about the gas hose and about portions of said control wires extending out of said first and second openings in said gas hose wall.

7. The invention defined in claim 6 wherein said annular sealing formations occupy said first and second openings in said gas hose wall and are flush with the interior of said gas hose.

* * * * *